Sept. 11, 1923.
W. ZEDERBOHM
METHOD OF STARTING ELECTRIC MOTORS
Filed Aug. 23, 1919
1,467,745
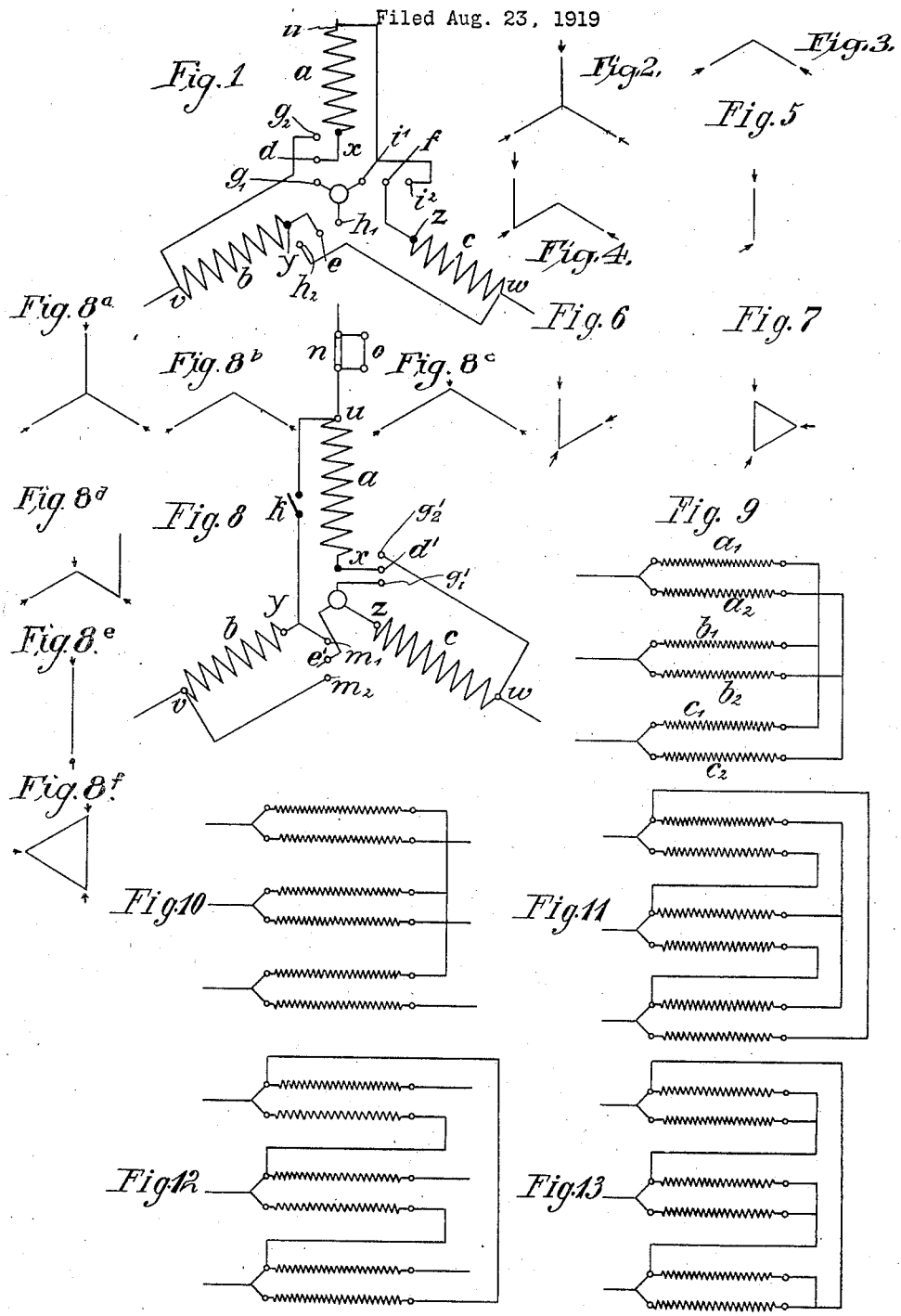

Patented Sept. 11, 1923.

1,467,745

UNITED STATES PATENT OFFICE.

WILLY ZEDERBOHM, OF BERLIN-CHARLOTTENBURG, GERMANY, ASSIGNOR TO SIEMENS-SHUCKERTWERKE GESELLSCHAFT MIT BESCHRANKTER HAFTUNG, OF BERLIN, GERMANY, A CORPORATION OF GERMANY.

METHOD OF STARTING ELECTRIC MOTORS.

Application filed August 23, 1919. Serial No. 319,516.

*To all whom it may concern:*

Be it known that I, WILLY ZEDERBOHM, residing at Berlin-Charlottenburg, Germany, have invented certain new and useful Improvements in Methods of Starting Electric Motors (for which I have filed application in Germany May 2, 1918, Ser. No. 48,240), of which the following is a specification.

My invention relates to the starting of electric motors and more especially three phase motors, and its particular object is to arrange the connections for starting the motors in such a manner as to obviate the drawbacks connected with the systems now in use.

It is well known to start three phase motors, by connecting the stator winding to the system at first in star connection and, after a certain number of revolutions has been attained, to change the windings from star over to delta connection. In doing this, however, the current must be interrupted and the motor is currentless and fieldless. On connecting the fieldless motor to the full voltage of the system there results a violent rush of switching-in current which may cause the overload cut-outs to be released, the fuses to blow and other troubles to arise.

This drawback is obviated according to the present invention by changing from star over to delta connection without interrupting the field, by way of intermediate connections, in which some current carrying contacts are connected with the windings by connections which belong to the star as well as to the delta type.

The change of connections mentioned above can be effected in different ways. In the drawings affixed to this specification and forming part thereof three modifications of the connecting system embodying my invention are illustrated, Figs. 1, 8 and 9 showing the different connection types, while Figs. 2 to 7, 8ª to 8ᶠ and 10 to 13 merely illustrate the succeeding phases of connection.

Referring to the drawings, Fig. 1 shows the ends $x$, $y$, $z$, of the respective phases $a$, $b$, $c$, which are next to the star point, and designed to be connected step by step to the leads $v$, $w$, $u$, respectively, of the phase next-following in the cycle. Three throw-over switches $d$, $e$, $f$ are provided to this end, said switches being connected to the ends $x$, $y$, $z$ of the phases, whose back-poles $g_1$, $h_1$, $i_1$ are connected to the star point, while the back-poles $g_2$, $h_2$, $i_2$ are connected to the lead of the phase next-following in the cycle. If now these said switches are operated one after the other, there result the voltage diagrams illustrated in Figs. 2 to 7.

Fig. 2 illustrates the situation resulting from closing the switches $d$ $g_1$, $e$ $h_1$ and $f$ $i_1$ respectively, while Fig. 3 corresponds to the release of switch $d$. As will be seen, the connections between the supply wires and the windings belong to the delta as well as to the star type at the same time, the phase $a$ belonging to the delta connection, while the phases $b$ and $c$ belong to the star connection. Fig. 4 results as soon as switch $d$ connects contact $x$ to $g_2$. When switch $e$ is released at $h_1$, the resulting distribution of pressure within the motor is illustrated by Fig. 5, winding $a$ being connected in delta fashion, while winding $c$ is connected to zero after star fashion. By connecting $e$ to $h_2$ there results the distribution of pressure illustrated in Fig. 6, where the windings $a$, $b$ belong to the delta connection. On changing switch $f$ from $i_1$ to $i_2$ there results the delta connection shown in Fig. 7. Instead of switch $f$ the end $z$ may remain connected with the star connection and in the last step, where it is changed over to delta, end $z$ may be connected with origin $u$ by aid of a simple switch.

The connections need not be made in the sequence described and they may also be varied in many directions. Thus for instance a throw-over switch, instead of being connected to the end of a phase, may as well be connected to the star point and the back poles of the said switch may be connected with the lead and the end of the phase respectively, as shown in Fig. 8. In this figure the turning point $e'$ is connected to the star point, the back pole $m_1$ to the end $y$ of phase $b$, and the back pole $m_2$ to the lead $v$ of this phase. This figure also shows a single pole switch $k$ connecting the end $y$ of phase $b$ with the lead $u$ of the phase $a$. The mode of starting the motor is similar to the one followed with the arrangement illustrated in Fig. 1. The connections need not be made singly, one after the other, as it is quite feasible to make two or more connections at a time. By suitably arranging the switches on a controller the changing over may be effected quickly, there being no danger that in certain cases such as the monophase connection illustrated in Fig. 5 the motor might break down with a weak field and stop altogether.

Too high currents in the single phases with unsymmetric connections can be obviated by inserting before the phase in question, such as phase $a$ (Fig. 8) a resistance $n$ provided with a short-circuiting device $o$. In view of this resistance being adjusted for a short interval only, it may be made rather weak, such as the protective resistance in a protective connection.

The operation of the arrangement according to Fig. 8 is as follows: At first the switch $k$ is left open and switches $d'\ g_1'$ and $e'\ m_1$ are closed, whereby the winding is arranged in star-connection as shown in Fig. $8^a$. Thereafter switch $d'\ g_1'$ is opened and thereby the winding $a$ separated from the center. At this moment the motor runs with the two windings $b$ and $c$, current being supplied as shown in Fig. $8^b$. Then switch $k$ is closed so that the motor now runs in the so-called V-connection, in which the three potentials are connected with the two windings $b$ and $c$ as is shown in Fig. $8^c$. Thereafter switch $d'\ g^{2'}$ is closed whereby the end $x$ of phase $a$ is connected with the beginning $w$ of phase $c$. This connection is illustrated in Fig. $8^d$, in which $c$ is common to the star-delta connection. Hereafter switch $e'm_1$ is opened and the distribution of potential is obtained in the motor in accordance with the diagram shown in Fig. $8^e$. Lastly by closing switch $e'\ m_2$ the complete delta-connection as shown in Fig. $8^f$ is obtained. Thus also by this method at no time interruption of the field occurs.

A different mode of changing over from star to delta without interrupting the field is illustrated by Figs. 9 to 13. Here the star connection is formed of a plurality of star systems $a_1$, $b_1$, $c_1$ and $a_2$, $b_2$, $c_2$ respectively, which are connected in parallel without their star points being connected, the said system being changed over from star to delta one after the other as shown in Figs. 9 to 13. First the star point of one system is opened (Fig. 10) and the said system is changed over to delta by itself (Fig. 11), this being once more a connection where the mains are connected to the winding in such a manner that there result connections which belong to the delta as well as to the star type, system $a_1$, $b_1$, $c_1$ being connected in star and system $a_2$, $b_2$, $c_2$ in delta connection.

Thereupon the star point of the second system is opened (Fig. 12) and this system is changed over to delta as well. There is no phase of the changing-over procedure where the motor is currentless. The arrangement described further offers the advantage, that the windings are always fed symmetrically. It is true that the winding systems present relative phase differences of the electromotive force, resulting in a compensating current. However this compensating current will never attain in the system a magnitude similar to that of the rush arising on the fieldless motor being started. In order to keep the compensating current low in case that it should be too strong, resistances may be connected here also in series with the single phases and these resistances should also be chosen equal to the usual protective resistances.

In the last mentioned modification the changing over from star to delta is effected in two main steps, the star connected winding being divided into two systems. If it is desired to have more than two main steps, the star-connected winding may be further divided.

I claim:

1. The method of starting a three phase motor by changing the connections of its field winding from star to delta without interrupting the motor field, which comprises successively disconnecting the end of each single phase winding from the star point and connecting it to one of the three-phase leads.

2. In a device of the kind described in combination a three phase motor, the phase windings of said motor being connected in star fashion, throw-over switches connected to the ends of two of said windings and a switch connected on one side to the end of the third phase and on the other side to the lead of the phase next-succeeding in the cycle.

3. In a device of the kind described in combination, a three phase motor, the phase windings of said motor being connected in star fashion, throw-over switches connected to the ends of the first and second of said windings, while the back poles of the first switch are connected to the lead and end of the second phase, the back poles of the second switch being connected to the lead and end of the third phase and a connection between the end of the third phase and the lead of the first phase.

In testimony whereof I affix my signature.

WILLY ZEDERBÖHM.